(12) United States Patent
Shi et al.

(10) Patent No.: US 9,802,174 B2
(45) Date of Patent: Oct. 31, 2017

(54) METHOD FOR PRODUCING ZIRCONIA COLLOIDS

(71) Applicants: ESSILOR INTERNATIONAL (COMPAGNIE GENERALE D'OPTIQUE), Charenton-le-Pont (FR); SHANGHAI UNIVERSITY, Shanghai (CN)

(72) Inventors: Liyi Shi, Shanghai (CN); Stephanie Pega, Charenton-le-Pont (FR); Xavier Panchout, Charenton-le-Pont (FR); Yves Leclaire, Charenton-le-Pont (FR); Shuai Yuan, Shanghai (CN); Zhuyi Wang, Shanghai (CN); Yin Zhao, Shanghai (CN); Jian Zhao, Singapore (SG)

(73) Assignees: ESSILOR INTERNATIONAL (COMPAGNIE GENERALE D'OPTIQUE), Charenton-le-Pont (FR); SHANGHAI UNIVERSITY, Shanghai (CN)

( * ) Notice: Subject to any disclaimer, the term of this patent is extended or adjusted under 35 U.S.C. 154(b) by 0 days.

(21) Appl. No.: 14/655,667

(22) PCT Filed: Dec. 26, 2012

(86) PCT No.: PCT/CN2012/087464
§ 371 (c)(1),
(2) Date: Jun. 25, 2015

(87) PCT Pub. No.: WO2014/100984
PCT Pub. Date: Jul. 3, 2014

(65) Prior Publication Data
US 2015/0328613 A1    Nov. 19, 2015

(51) Int. Cl.
*C01G 25/02* (2006.01)
*B01J 13/00* (2006.01)

(52) U.S. Cl.
CPC .......... *B01J 13/0047* (2013.01); *C01G 25/02* (2013.01); *C01P 2002/60* (2013.01);
(Continued)

(58) Field of Classification Search
CPC ............................ B01J 13/0047; C01G 25/02
See application file for complete search history.

(56) References Cited

U.S. PATENT DOCUMENTS

| 4,152,281 A | 5/1979 | Arendt et al. |
| 4,501,818 A * | 2/1985 | Rossi .................... C01B 13/328 423/266 |

(Continued)

FOREIGN PATENT DOCUMENTS

| CN | 1699184 A | 11/2005 |
| CN | 1830810 A | 9/2006 |

(Continued)

OTHER PUBLICATIONS

Yishi, H. et al.: "Preparation of nanometer ZrO_2 by one step hydro-thermal method", Inorganic Chemicals Industry, vol. 7, (2005), pp. 15-17. (English Abstract).

(Continued)

*Primary Examiner* — Michael A Salvitti
(74) *Attorney, Agent, or Firm* — Norton Rose Fulbright US LLP

(57) ABSTRACT

The present invention pertains to a method for producing a colloidal suspension of zirconia particles, comprising the following successive steps: a) subjecting a mixture of zirconium oxychloride and an alkali metal halide in an aqueous solvent to hydrothermal treatment at a temperature above 150° C., so as to obtain a suspension in the form of a (Continued)

two-phase mixture comprising a slurry and a supernatant, b) without first peptizing it, desalting said suspension so as to form a colloidal suspension of zirconia.

16 Claims, 4 Drawing Sheets

(52) U.S. Cl.
CPC ...... *C01P 2002/72* (2013.01); *C01P 2002/82* (2013.01); *C01P 2002/85* (2013.01)

(56) References Cited

U.S. PATENT DOCUMENTS

| | | | |
|---|---|---|---|
| 7,629,389 B2 | 12/2009 | Ohmori et al. | |
| 2010/0144918 A1* | 6/2010 | Chaput | B01J 13/0047 523/105 |
| 2014/0125946 A1* | 5/2014 | Leclaire | B01J 13/0047 351/159.57 |
| 2015/0328613 A1* | 11/2015 | Shi | B01J 13/0047 516/33 |

FOREIGN PATENT DOCUMENTS

| | | |
|---|---|---|
| CN | 101613123 A | 12/2009 |
| EP | 2371768 | 10/2011 |
| JP | 2005179111 | 7/2005 |
| KR | 20090003140 | 1/2009 |
| WO | WO2001/030702 | 5/2001 |
| WO | WO2007/000926 | 1/2007 |

OTHER PUBLICATIONS

Xie Gensheng: "The Role of Alkali Metal Compounds in Hydrothermal Synthesis of ZrO2 Nanocrystals", Materials Review, May 2006, vol. 20, p. 159-160 (English Abstract).

* cited by examiner

METHOD FOR PRODUCING ZIRCONIA COLLOIDS

CROSS-REFERENCE TO RELATED APPLICATIONS

This application is a national phase application under 35 U.S.C. §371 of International Application No. PCT/CN2012/087464 filed 26 Dec. 2012, the entire contents of which is specifically incorporated herein by reference without disclaimer.

FIELD OF THE INVENTION

The present invention pertains to a method for producing a colloidal suspension of zirconia particles, which is intended to be included in a coating composition for the manufacture of an optical article, such as an ophthalmic lens.

BACKGROUND OF THE INVENTION

It is well-known in the ocular glass field to use inorganic colloids in scratch-resistant and/or abrasion-resistant coatings (also referred to as "hard coatings") for improving the surface properties of organic glasses and/or for modifying the refractive index thereof. Such colloids are also used in anti-reflection coatings as well as in impact-resistant primers.

Zirconia, or zirconium dioxide, is one of these known colloids, because it provides a number of useful mechanical and physical properties, including high fracture toughness, mechanical strength and hardness, low thermal conductivity, high refractive index and transparency in the visible and infra-red spectral regions. However, it may be difficult to produce in a simple and reproducible manner a colloidal suspension of zirconia with high crystallinity in the form of a stable homogeneous dispersion of nanoparticles (having an average particle size of less than 20 nm) at high solids content (above 20 wt. % and up to 35 wt. %), and also to avoid their aggregation both during the preparation of the sol and during incorporation into a polymer matrix, for instance an epoxysilane matrix. Such a homogeneous dispersion is however required for the formation of a transparent zirconia-containing composite film and it directly affects the haze and transparency of the optical coating. This stable homogeneous dispersion may be expressed by the zeta potential of the suspension, which absolute value should be of at least 30 mV, and by its viscosity, which should be less than 10 cPs at 25° C. (no gelling should occur). The transparency is ensured by the low particle size with uniform and narrow size distribution. The high refractive index is related to the high crystallinity of the colloidal zirconia.

Several methods have already been proposed to prepare colloidal zirconia.

One known method for preparing acid zirconia colloids was to directly heat an aqueous solution of acid zirconium sources, such as zirconium oxychloride or zirconium nitrate, as disclosed in EP 0 229 657 and U.S. Pat. No. 2,984,928. Due to the strong acidic system, this kind of method results in zirconia colloids having a low crystallinity and in an incomplete reaction of the precursor, even through long heat treatment time of several days. This low crystallinity of the product would affect the refractive index of zirconia colloids, and directly affects their application in optical coatings.

Still another approach described in CN-101613123 and by HUANG Y. et al. in *Wujiyan Gongye*, 37(7), 15-17 (2005) has consisted in reacting a zirconium source, such as zirconium oxychloride, with an alkaline precipitant such as ammonia to obtain a zirconium hydroxide precipitate which is then subjected to hydrothermal treatment in the presence of a mineralizer, such as $NH_4Cl$, a hydroxide or a carbonate, for instance at a temperature of 125-350° C. After drying, a zirconia powder having a small and/or uniform particle size and a good dispersibility is said to be obtained. However, these methods lead to dry powders. When redispersed in a solvent, the particles will remain aggregated in some extent, which will be detrimental to the transparency of the colloidal suspensions obtained.

Similarly, US 2010/0144918 discloses a method for preparing colloidal zirconia suspensions, starting from a zirconium hydroxide suspension which may be prepared by adding a basic precipitant such as ammonia to zirconium oxychloride. Zirconium hydroxide is then reacted with an inorganic acid such as HCl before hydrothermally treating the suspension at 150-200° C. This method results in a zirconia sol having a dry matter content of 3-10% only, in which zirconia is provided as crystals having a mainly tetragonal crystalline phase and which are suspended in an aqueous medium. This suspension cannot be obtained with a dry matter content of more than 15% by weight. Moreover, these tetragonal crystals cannot be easily dispersed in a alcoholic solvent which is required for dispersing the colloidal particles into the polymer matrix of a hard-coat composition. The appearance of the resulting hard-coat thus becomes progressively milky, which is not desirable. Dispersion of these zirconia particles in an alcoholic solvent or directly in a polymer matrix can only be achieved after grafting the colloidal zirconia with a reactive solvent such as HEMA or methacrylic acid. This step is of course detrimental to the economics of the process for manufacturing the hard-coat.

After conducting extensive research, the present inventors have demonstrated that the addition of a specific type of mineralizer to zirconium oxychloride, before subjecting it to a hydrothermal treatment performed within a specific reaction temperature range, allowed the formation of a colloidal suspension of zirconia crystals having a monoclinic crystalline phase, at high dry content. This suspension has the properties required for an application in optical coatings, especially a high crystallinity, small particle size and a good dispersion.

A process has thus been proposed, which included the steps of: (a) subjecting a mixture of zirconium oxychloride and an alkali metal halide in an aqueous solvent to hydrothermal treatment at a temperature above 150° C.; (b) separating the slurry obtained from the supernatant, (c) peptizing said slurry by adding a strong acid thereto, and (d) desalting said slurry, for example by ultrafiltration, so as to form a colloidal suspension of zirconia.

Further research has now led to an improved process which can be easily upgraded to industrial scale with an improved yield and which is even more simple and economical than the above process, by reducing both the number of steps and of reactants needed, without altering the properties of the colloidal suspension of zirconia obtained.

SUMMARY OF THE INVENTION

An object of this invention is drawn to a method for producing a colloidal suspension of zirconia particles, comprising the following successive steps:

a) subjecting a mixture of zirconium oxychloride and an alkali metal halide in an aqueous solvent to hydrothermal treatment at a temperature above 150° C., so as to obtain a suspension in the form of a two-phase mixture comprising a slurry and a supernatant, and
b) without first peptizing it, desalting said suspension so as to form a colloidal suspension of zirconia.

The above process is economical since it does not require to separate the slurry from the supernatant and to peptize it before the desalting step, which both saves two method steps and avoids using a peptizing agent such as hydrochloric acid. Moreover, this process also results in a suspension having a higher pH before desalting, which fastens the desalting step, since the target pH will be reached earlier. The economics of the process are thus further improved. By omitting the separation step, the yield of this process is also higher, since there is no product loss.

DETAILED DESCRIPTION OF THE INVENTION

As mentioned above, the present invention is drawn to a method for producing a colloidal suspension of zirconia particles, comprising the following successive steps:
a) subjecting a mixture of zirconium oxychloride and an alkali metal halide in an aqueous solvent to hydrothermal treatment at a temperature above 150° C., so as to obtain a suspension in the form of a two-phase mixture comprising a slurry and a supernatant, and
b) without first peptizing it, desalting said suspension so as to form a colloidal suspension of zirconia.

In the first step of this method, zirconium oxychloride is used as a precursor of zirconium. As shown in the Examples below, experiments have shown that this precursor results in zirconia which is better dispersed than when using other sources of zirconium, such as zirconium nitrate. Zirconium oxychloride is blended with a mineralizer, namely an alkali metal halide. The choice of this mineralizer is also critical because experiments have shown that it enhances the crystallinity of the zirconia colloid, which directly affects the dispersion, transparency and stability of this colloid. The alkali metal halide may be selected from KF, KCl, KBr, KI, NaF, NaCl, NaBr, NaI, LiF, LiCl, LiBr, LiI and their mixtures. Potassium chloride is preferred in this invention.

The precursor and the mineralizer may be blended in any order. For instance, an aqueous solution of the mineralizer may be added slowly into an aqueous solution of the precursor. Alternatively, a solid mineralizer may be added to a powder of the precursor, then both solids may be dissolved by adding water thereto. This embodiment is preferred because it allows further simplifying the process of this invention. Zirconium oxychloride is preferably mixed with the alkali metal halide AX in a molar ratio of $AX/ZrOCl_2$ from 1/10 to 1/1 and preferably from 1/4 to 1/2. Moreover, the zirconium oxychloride concentration in said mixture may range from 0.5 to 4 mol/l and preferably from 1 to 2 mol/l.

The mixture used in step (a) preferably does not contain any ammonium salt or ammonia. This mixture is then subjected to a hydrothermal treatment, which may be conducted in an autoclave during at least one day, for instance during 30 to 80 hours, at a temperature of 150 to 220° C., preferably from 160 to 200° C. and more preferably from 175 to 190° C. In this step, it is preferable not to add any other solvent to the mixture, such as an alcohol, because it has been shown that using mixed water/methanol or water/ethanol solvents resulted in a very bad dispersion of zirconia, as evident from TEM images, which detrimentally affected the transparency of the suspension.

This hydrothermal treatment results in a two-phase mixture, namely a thick, white and viscous slurry containing most of the zirconia produced, and a transparent upper solution (or supernatant). The zirconia particles thus obtained are highly redispersible in water. A simple addition of deionized water to dilute the two-phase mixture, together with stirring, allows obtaining a stable and homogenous suspension without the need to perform any peptization step, for instance by adding a strong acid. Therefore, the suspension obtained in the first step of this process may optionally be diluted with water before performing the second step.

In the second step of this method, the suspension resulting from step (a) and optionally diluted is desalted by any appropriate means, such as by dialysis or by ultrafiltration. In an embodiment of the invention, the undiluted suspension obtained in step (a) is desalted in step (b) by performing dialysis in water. In a preferred embodiment, however, the diluted suspension is desalted in step (b) by performing ultrafiltration. In this latter case, diluting the two-phase mixture of step (a) with water allows obtaining a stable homogenous suspension before starting ultrafiltration. Ultrafiltration may be conducted through a polymer or ceramic membrane.

The dry matter content of the suspension may then be adjusted, if needed, up to 35 wt. %. Such adjustment may be obtained by concentrating the suspension, for instance by evaporation or by ultrafiltration, in order to obtain a colloidal suspension of zirconia with a high solids content, which can be shipped and stored at a decreased cost and enables the formulation of an optical coating having a higher solids content too.

The process of this invention may include a further step of solvent exchange, which is intended to substitute at least one alcoholic solvent for part or all of the aqueous solvent contained in the suspension. This step can be advantageous in case the zirconia colloid is intended to be incorporated into a composition forming an optical coating after polymerization, because alcoholic solvents ensure effective redispersion in polymer matrixes forming these coatings. Solvent exchange may be performed by dialysis or diafiltration (using an ultrafiltration polymer or ceramic membrane). Compared to the dialysis process, diafiltration is preferred because less solvent is consumed to reach the same residual water content and because it allows obtaining a suspension with higher solids content without any gelling of the colloidal suspension. The alcoholic solvent may be chosen from alcohols such as, but non-exhaustively, methanol, ethanol, 1-methoxy-2-propanol and their mixtures. The residual water content after solvent exchange may be maintained from 0 to 10% by weight of the final suspension. The dry matter content, the water content and the nature of the alcoholic solvent are parameters that allow improving the viscosity, the thickness and the abrasion resistance of the optical coating comprising the zirconia particles of this invention.

The method of this invention may also include other intermediate or subsequent steps, in addition to those mentioned above. For instance, it can include a step of improving zirconia dispersion, either by adding a dispersant, for example selected from α-hydroxyacids such as gluconic acid, citric acid and/or tartaric acid for stabilization purpose, or by surface modification of the zirconia, both of which may be performed either after the desalting step or even after the solvent-exchange step described above.

Another intermediate or subsequent step can also be a step of pH modification by addition of an organic or inorganic base, which can be possibly followed by a desalting step to obtain the stable colloid in a basic pH.

The stabilization and the pH modification steps may advantageously be simultaneously performed by the addition of a single additive, selected from hydroxycarboxylates and their mixtures, such as potassium sodium tartrate and trisodium citrate, and possibly followed by a desalting step to adjust the basic pH of the stable colloid, typically between 8 and 10.

The method of this invention results in a transparent colloidal suspension of highly crystalline zirconia, in which zirconia is provided as crystals having a monoclinic crystalline phase, that is in the form of rod-like crystallites, the dimensions of which range preferably from 1 to 30 nm and most preferably from 1 to 15 nm along their short axis and preferably from 3 to 90 and most preferably from 3 to 30 nm along their long axis.

It is well understood that the dimensions along the "short axis" will be comprised within the above ranges but in any case smaller than those measured along the "long axis", which will also be comprised within the above ranges. Moreover, the dimensions of the crystallites may be tuned by selecting specific alkali metal halides; for instance, preliminary experiments have shown that larger particles may be obtained using fluorides instead of chlorides.

In the present description, the expression "zirconia crystals having a monoclinic crystalline phase" refers to zirconia crystals, the X-Ray diffractogram of which exhibits, at room temperature, peaks characteristic of the monoclinic phase according to Noh et al., *Materials Letters* 57 (2003) 2425 and does not exhibit any peak positioned at 30° (in 2θ°) characteristic of the cubic and/or tetragonal phases according to R. Srinivasan et al., *J. Mater. Res.* (1991) Vol. 6, No. 6, 1287. The rod-like morphology of the particles is also a feature characteristic of the monoclinic zirconia crystalline phase according to Noh et al., *Materials Letters* 57 (2003) 2425.

The suspension obtained according to this invention may also be characterized by its zeta potential, which absolute value is generally of at least 30 mV and/or by the refractive index of the zirconia particles, which is usually of at least 1.8, preferably of at least 1.9, with a solid content of at least 15 wt. %, preferably of at least 20 wt. % and up to 35 wt. %. Its pH may be between 2 and 11. Furthermore, its viscosity is preferably below 10 cPs, as measured at 25° C. with a Brookfield Viscosimeter DV-C with UL adapter.

This zirconia colloid may then be used in the manufacture of an optical coating, such as an abrasion- or scratch-resistant coating or an anti-reflective coating. For this purpose, it may be introduced into a coating composition which includes an epoxysilane (such as GLYMO) and optionally also other colloidal particles than zirconia and/or a curing catalyst (such as an aluminium chelate) and/or at least one alkoxysilane which does not contain any reactive functional group but optionally contains at least one non-hydrolyzable organic group. After or before introducing therein the zirconia colloid, this composition may be hydrolyzed, and it may then be cured, according to well-known sol/gel processes. Alternatively, the zirconia colloid of this invention may be introduced into an adhesion or impact-resistant primer composition, comprising a thermoplastic matrix including polyurethane or a homo- or copolymer of (meth) acrylic acid ester.

The above coating composition may be applied, for instance by dip coating or spin coating, onto a transparent polymer substrate, which may be a thermoplastic resin such as thermoplastic polycarbonate derived from bisphenol A, polyurethane and homo- and copolymers of (meth)acrylate, or a thermoset or photo-cured resin, which may be obtained by polymerization of allyl carbonates of linear or branched aliphatic or aromatic polyols such as diethylene glycol bis(allyl carbonate) (CR 39®).

It is thus possible to obtain an optical article, such as an ophthalmic lens, comprising a transparent polymer substrate and at least one coating prepared from a composition comprising a colloidal suspension as described above.

DRAWINGS

EXAMPLES

Figure 1:
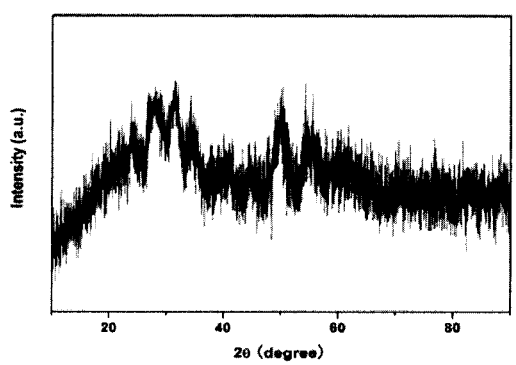
FIG. 1 illustrates the XRD pattern of zirconia colloid prepared using $ZrOCl_2$ as a zirconium source without any mineralizer.

This invention will be further illustrated y the following non-limiting examples which are given for illustrative purposes only and should not restrict the scope of the appended claims.

Example 1

Preparation of an Acidic Water-based Zirconia Colloid 9.9 g of KCl and 170.85 g of $ZrOCl_2.8H_2O$ were dissolved in 289.5 g of deionized water under magnetic stirring.

375 ml of the mixture thus obtained were filled into a 500 ml Teflon® lined autoclave. The autoclave was placed in an oven and heated to a temperature of 180° C. during 72 h.

2 l of deionized water were added under stirring to the two-phase mixture thus obtained. The diluted suspension was then desalted by ultrafiltration until a pH of 3.6 was reached. The dry content was adjusted between 16% and 16.5% and resulted in 380 ml of colloidal suspension. The yield of conversion of the zirconium precursor into zirconia particles was close to 90%.

Example 2

Preparation of Acidic Methanol-based Colloidal Zirconia

One part of the suspension obtained in Example 1 was solvent exchanged by diafiltration. To achieve this, the colloidal suspension was concentrated by using an ultrafiltration apparatus while absolute methanol was continuously added to the suspension. The process was stopped when the water content in the suspension was lower than 0.1% by weight and the suspension was then concentrated until reaching a dry content of 21.5% by weight. The yield of conversion of the zirconium precursor into zirconia particles was close to 90%. A colloidal zirconia suspension in methanol was thus obtained.

Example 3

Preparation of Alkaline Water-based Colloidal Zirconia

One part of the zirconia suspension obtained in example 1 was further modified to increase its pH. To achieve this, 54.5 g of deionised water were added to 21.1 g of zirconia suspension obtained from example 1. On another side, 0.35 g of trisodium citrate was dissolved in 30 ml of deionised water. The trisodium citrate solution was then added to the zirconia suspension at a rate of 2.5 ml/min under continuous stirring. After the addition was completed, the suspension was stirred continuously for 12 h. The obtained suspension was then acidified to pH=8.5 and concentrated to 20% dry weight content by ultrafiltration. Stable and transparent alkaline water-based zirconia suspension was thus obtained, with a zeta potential of –62 mV.

Example 4

Characterization of the Colloidal Zirconia of Example 1

A series of experiments were performed on the colloidal suspension obtained in Example 1. TEM observation (JEM-200CX® electron microscope from JEOL) allowed checking particle size, shape and aggregation state. Moreover, a powder XRD pattern of the sample was performed on a D/Max-2200 X-ray diffraction meter (RIGAKU CORPORATION) at room temperature, operating at 30 kV and 30 mA, using Cu kα radiation (λ=0.15418 nm). According to the TEM and XRD observations, the colloidal zirconia had a high crystallinity and it was present as single rod-like monoclinic nanocrystallites with short axis range from 2 to 5 nm and long axis range from 3 to 14 nm. TEM observations confirmed also that the particles were well dispersed and not aggregated, as was also indicated by the transparency of the colloidal suspension.

The zeta potential, as measured with a Zetasizer Nano ZS90® (MALVERN INSTRUMENTS Ltd.), was 34.5 mV, indicating the high stability of the suspension. Moreover, the particle size distribution obtained by Zetasizer was narrow, indicating a uniform size distribution.

Further, elemental analysis was performed by inductively-coupled plasma-atomic emission spectroscopy (ICP-AES, Optima 7300DV) and X-ray fluorescence to assess the bulk chemical composition of the product. They showed the high purity of the zirconia colloid produced.

Moreover, X-ray photoelectron spectroscopy (XPS) was conducted to investigate the surface chemical composition and valence state of the zirconia colloid sample. Spectra were recorded by a PHI-5000C ESCA spectrometer using Mg Ka radiation (hv=1253.6 eV). The C 1 s line was taken as a reference to calibrate the shift of binding energy due to electrostatic charging. From this experiment, one could confirm that the oxidation state of Zr was +4 and that there was only one chemical state of oxygen in zirconia.

Finally, after drying the zirconia sample into a powder at room temperature, FTIR spectra were measured on an AVATAR® 370-IR spectrometer (THERMO NICOLET) with a wavenumber range of 4000 to 400 $cm^{-1}$. Absorption bands located at 3396 $cm^{-1}$, 1629 $cm^{-1}$ and 500-1000 $cm^{-1}$ were respectively attributed to the O—H (and molecularly adsorbed water), H—O—H and Zr—O stretching or bending vibrations. These results also confirmed that no organic group was detected in the dried powder, showing that the particles surface was not functionalized with organic groups.

These experiments confirm that pure zirconia colloids with high dispersion, transparency, stability, refractive index and solid content could be prepared by the method if this invention.

Example 5

Influence of the Mineralizer

Zirconia colloids were prepared according to a process similar to that described in Example 1, except that various mineralizers were used instead of KCl, as well as no mineralizer at all.

The colloid obtained without any mineralizer resulted in the XRD pattern shown in FIG. 1. Using KCl as a mineralizer resulted in the XRD patterns shown on FIG. 3. Diffraction peaks without mineralizer are very weak, characteristic of nearly amorphous particles. On the contrary, the peaks are intense and sharper when KCl is used as mineralizer, showing that the high crystallinity can only be obtained by the use of a suitable mineralizer, like KCl.

Figure 2:
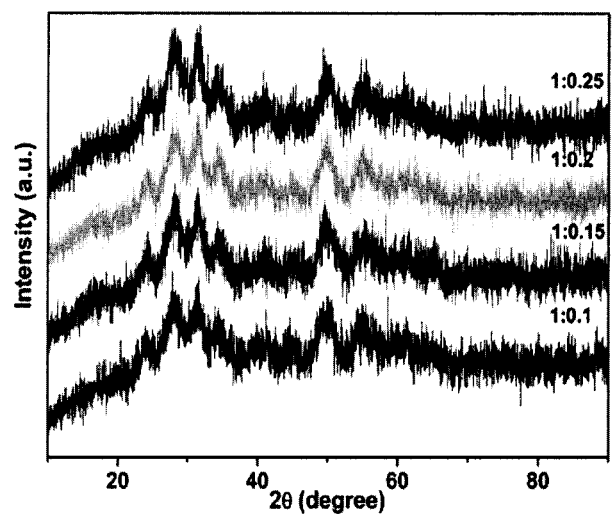
FIG. 2 illustrates the XRD patterns of zirconia colloids prepared using $ZrOCl_2$ as a zirconium source and NaOH as mineralizer (a: $ZrOCl_2$:NaOH=1:0.1; b: $ZrOCl_2$:NaOH=1:0.15; c: $ZrOCl_2$:NaOH=1:0.2; d: $ZrOCl_2$:NaOH=1:0.25.
Figure 3:
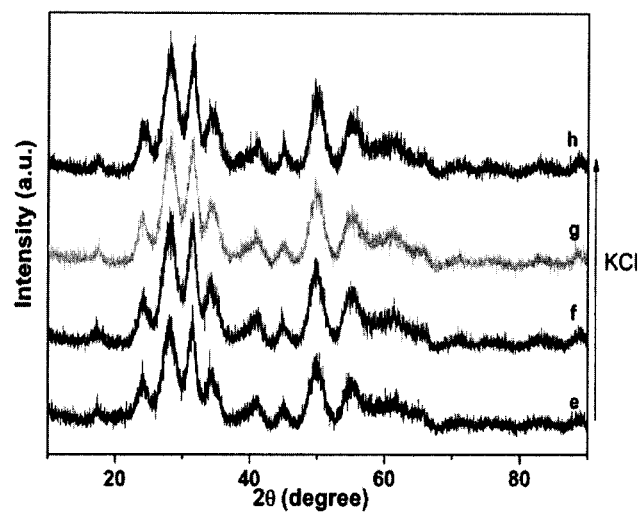
FIG. 3 illustrates the XRD patterns of zirconia colloids prepared using $ZrOCl_2$ as a zirconium source and KCl as mineralizer (e: $ZrOCl_2$:KCl=1:0.0625; f: $ZrOCl_2$:KCl=1:0.25; g: $ZrOCl_2$:KCl=1:0.5; h: $ZrOCl_2$:KCl=1:0.75).

NaOH was then used as a mineralizer in different molar ratios of $ZrOCl_2$:NaOH. The XRD patterns of the colloids obtained are shown on FIG. 2. A comparison of FIGS. 2 and 3 shows that, whatever the molar ratio tested, the diffraction peaks are stronger, and thus the crystallinity of the zirconia colloid is always higher, when KCl is used as a mineralizer.

Various other alkali metal halides were then investigated. The XRD patterns obtained are shown on FIG. 4. As illustrated, all samples prepared by using different alkali metal halides as mineralizers exhibited much higher crystallinity when compared with the samples prepared by using NaOH as a mineralizer (see FIG. 2).

Figure 4:
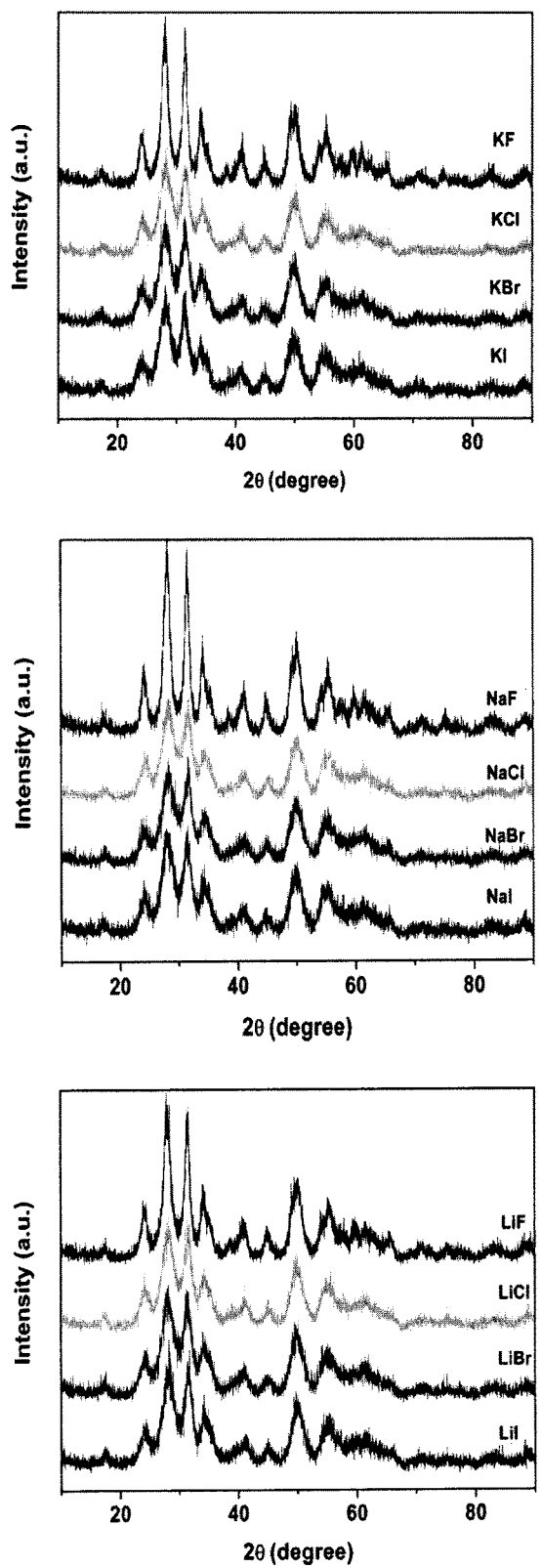
FIG. 4 illustrates the XRD patterns of zirconia colloids prepared using different alkali metal halides.

Among those alkali metal halides, the diffraction patterns obtained by use of alkali metal fluoride exhibit sharper and more intense peaks than the others (see FIG. 4). This shows that alkali metal fluorides lead to larger crystal size than when other alkali metal halides are used as mineralizers. This fact was confirmed also by particle size measurements from TEM images. The crystallites obtained from KCl had average dimensions of 3.5 nm width for 8 mm length, whereas those prepared from KF had 8 mm width for 13 mm length.

This example demonstrates that the type of mineralizer significantly affects the crystallinity and the particle size of the zirconia colloid obtained, which directly affects the refractive index and the transparency of this product, and its achievable maximum solid content. Alkali metal halides provide for a significantly enhanced crystallinity compared with NaOH, which is thought to be due to their ability to modify the viscosity and the solubility properties in the reactive solution during the hydrothermal treatment. This example demonstrates also that the choice of the alkali metal halide mineralizer can allow tuning the final particle size.

Example 6

Influence of the Reaction Temperature

Two zirconia colloids were prepared according to a process similar to that disclosed in Example 1, in which the reaction temperature was lowered to 120 and 150° C., respectively.

Figure 5:
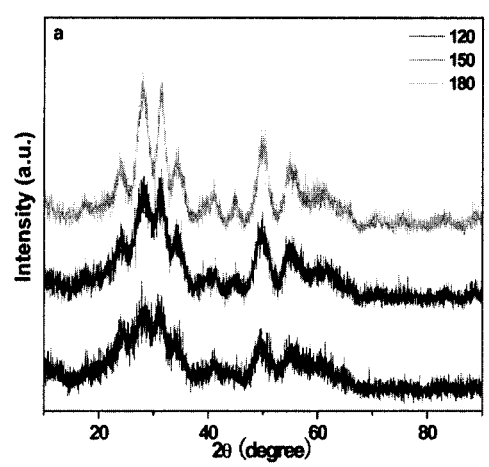
FIG. 5 illustrates the XRD patterns of zirconia colloids prepared at different temperatures and using KCl as mineralizer ($ZrOCl_2$:KCl=1:0.25).

As evident from FIG. 5, which illustrates the XRD spectra of these samples and of that of Example 1, the crystallinity of zirconia was better at 180° C., which was reflected by sharper peaks. Moreover, TEM images of these samples showed the samples prepared at 120° C. and 150° C. had more agglomerated particles. The colloidal suspension obtained by thermal treatment at 180° C. exhibited also higher transparency than those prepared at 120° C. and 150° C. This shows that the colloids prepared at 120° C. and 150° C. were poorly dispersed, compared with that prepared at 180° C. This result was confirmed using a higher molar ratio of KCl to $ZrOCl_2$ (0.5:1).

This example shows that the reaction temperature has an obvious effect on the crystallinity and dispersion of the zirconia colloid, and that temperatures above 150° C. give better results in this respect.

Example 7

Influence of the Zirconium Source

A zirconia colloid was prepared according to a process similar to that described in Example 1, in which zirconium nitrate was substituted for zirconium oxychloride as the zirconium source.

It was observed that, compared with the sample using $ZrOCl_2$ as the zirconium source, the sample prepared using $Zr(NO_3)_4$ possess a higher crystallinity but lower dispersion and transparency, which are however crucial from the standpoint of the stability of the zirconia colloid formed and of the maximum solid content which may be achieved.

This example shows that the zirconium source affects the dispersion of the zirconia colloid obtained and that $ZrOCl_2$ is a better zirconium source, in this regard, than $Zr(NO_3)_4$.

The invention claimed is:

1. A method for producing a colloidal suspension of zirconia particles, comprising the following successive steps:
    (a) subjecting a mixture of zirconium oxychloride and an alkali metal halide AX in an aqueous solvent to hydrothermal treatment at a temperature above 150° C., so as to obtain a suspension in the form of a two-phase mixture comprising a slurry and a supernatant, and
    (b) desalting said suspension, without first peptizing said suspension, so as to form a colloidal suspension of zirconia.

2. The method according to claim 1, wherein the suspension obtained in step (a) is diluted with water before performing step (b).

3. The method according to claim 2, wherein the diluted suspension is desalted in step (b) by performing ultrafiltration.

4. The method according to claim 1, wherein the alkali metal halide is potassium chloride.

5. The method according to claim 1, wherein zirconium oxychloride and the alkali metal halide are mixed in a molar ratio of $AX/ZrOCl_2$ from 1/10 to 1/1.

6. The method according to claim 1, wherein zirconium oxychloride and the alkali metal halide are mixed in a molar ratio of $AX/ZrOCl_2$ from 1/4 to 1/2.

7. The method according to claim 1, wherein zirconium oxychloride concentration in said mixture ranges from 0.5 to 4 mol/l.

8. The method according to claim 1, wherein zirconium oxychloride concentration in said mixture ranges from 1 to 2 mol/l.

9. The method according to claim 1, wherein the hydrothermal treatment is conducted at a temperature from 150 to 220° C. during at least one day.

10. The method according to claim 1, wherein the hydrothermal treatment is conducted at a temperature from 160 to 200° C. during at least one day.

11. The method according to claim 1, wherein the hydrothermal treatment is conducted at a temperature from 175 to 190° C. during at least one day.

12. The method according to claim 1, wherein the suspension obtained in step (a) is desalted in step (b) by performing dialysis in water.

13. The method according to claim 1, further comprising a step of solvent-exchange so as to substitute at least one alcoholic solvent for part or all of the aqueous solvent included in the suspension.

14. The method according to claim 13, wherein solvent exchange is performed by dialysis or diafiltration.

15. The method according to claim 1, further comprising an intermediate or subsequent step of improving zirconia dispersion, either by adding a dispersant, or by surface modification of the zirconia.

16. The method according to claim 1, further comprising an intermediate or subsequent step of pH modification by addition of an organic or inorganic base.

* * * * *